(12) United States Patent
Borkenhagen et al.

(10) Patent No.: US 8,738,962 B2
(45) Date of Patent: May 27, 2014

(54) MEMORY MIRRORING WITH MEMORY COMPRESSION

(75) Inventors: John M. Borkenhagen, Rochester, MN (US); Jan M. Janick, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 307 days.

(21) Appl. No.: 12/947,926

(22) Filed: Nov. 17, 2010

(65) Prior Publication Data
US 2012/0124415 A1 May 17, 2012

(51) Int. Cl.
*G06F 11/00* (2006.01)

(52) U.S. Cl.
USPC .......................................... 714/6.1; 714/6.23

(58) Field of Classification Search
USPC ........................................................ 714/6.1
See application file for complete search history.

(56) References Cited

U.S. PATENT DOCUMENTS

| | | | |
|---|---|---|---|
| 5,255,382 A | 10/1993 | Pawloski | |
| 5,555,392 A | 9/1996 | Chaput et al. | |
| 5,812,817 A | 9/1998 | Hovis | |
| 6,658,549 B2 | 12/2003 | Wilson | |
| 6,681,305 B1 | 1/2004 | Franke et al. | |
| 6,766,429 B1 * | 7/2004 | Bland et al. | 711/161 |
| 6,775,751 B2 | 8/2004 | Tremaine | |
| 6,944,740 B2 | 9/2005 | Abali et al. | |
| 6,956,507 B2 | 10/2005 | Castelli et al. | |
| 6,961,821 B2 | 11/2005 | Robinson | |
| 6,968,424 B1 * | 11/2005 | Danilak | 711/113 |
| 7,225,307 B2 * | 5/2007 | Micka et al. | 711/161 |
| 7,293,195 B1 * | 11/2007 | Watanabe et al. | 714/5.11 |
| 7,302,543 B2 | 11/2007 | Lekatsas et al. | |
| 7,360,024 B2 | 4/2008 | Hironaka et al. | |
| 7,636,810 B2 | 12/2009 | Ramakrishnan | |
| 7,836,020 B1 * | 11/2010 | Rao et al. | 707/649 |
| 7,930,483 B2 | 4/2011 | Borkenhagen | |
| 7,949,865 B1 * | 5/2011 | Yadav | 713/1 |
| 7,984,240 B2 | 7/2011 | Borkenhagen | |
| 8,037,251 B2 | 10/2011 | Borkenhagen | |
| 8,090,908 B1 * | 1/2012 | Bolen et al. | 711/114 |
| 8,205,043 B2 * | 6/2012 | Bolen et al. | 711/114 |
| 8,495,267 B2 * | 7/2013 | Abali et al. | 710/262 |
| 2001/0001872 A1 | 5/2001 | Singh et al. | |
| 2004/0264256 A1 | 12/2004 | Mauritz et al. | |
| 2006/0069879 A1 | 3/2006 | Inoue et al. | |

(Continued)

FOREIGN PATENT DOCUMENTS

EP    1400899 A2    3/2004

OTHER PUBLICATIONS

Tremaine et al., IBM Memory Expansion Technology (MXT), IBM Journal of Research and Development, vol. 45, No. 2, Mar. 2001, (pp. 271-285).

(Continued)

*Primary Examiner* — Kamini Patel
(74) *Attorney, Agent, or Firm* — Toler Law Group (57) ABSTRACT

Systems and methods to manage memory are provided. A particular method may include storing data in a primary memory that is in communication with a processor and storing in a mirrored data in a mirrored memory. The mirrored data may be compressed, and the mirrored memory may be in communication with the processor. A failure condition associated with the data of the primary memory may be detected. In response to the detected failure condition, the mirrored data in the mirrored memory may be accessed.

18 Claims, 5 Drawing Sheets

(56) References Cited

U.S. PATENT DOCUMENTS

| | | |
|---|---|---|
| 2006/0101206 A1 | 5/2006 | Wood et al. |
| 2008/0022048 A1 | 1/2008 | Baker |
| 2009/0228635 A1* | 9/2009 | Borkenhagen ................ 711/103 |
| 2009/0228656 A1* | 9/2009 | Borkenhagen ................ 711/118 |
| 2009/0228664 A1* | 9/2009 | Borkenhagen ................ 711/154 |
| 2009/0228668 A1* | 9/2009 | Borkenhagen ................ 711/161 |
| 2009/0300414 A1* | 12/2009 | Huang et al. ................... 714/11 |

OTHER PUBLICATIONS

International Search Report and Written Opinion of the ISA dated Mar. 14, 2012—International Application No. PCT/EP2011/070114.

* cited by examiner

MEMORY MIRRORING WITH MEMORY COMPRESSION

I. FIELD OF THE DISCLOSURE

The present disclosure relates generally to computer memory architecture, and in particular, to an environment for managing mirrored memory.

II. BACKGROUND

Memory mirroring is the practice of creating and maintaining a copy of original data in system memory. Within a mirrored environment, significant portions of the physical memory may be designated as mirrored memory. The allocation of physical memory to mirrored memory may represent a significant manufacturing cost and may limit overall memory storage. Although memory mirroring offers increased system reliability, the reduction in memory capacity may result in reduced system performance.

III. SUMMARY OF THE DISCLOSURE

In a particular embodiment, a method to manage memory includes storing data in a primary memory in communication with a processor. Mirrored memory that mirrors the data stored in the primary memory may be stored. The mirrored memory may be compressed and in communication with the processor. A failure condition associated with the data of the primary memory may be detected. In response to the detected failure condition, the mirrored data in the mirrored memory may be accessed.

In another embodiment, an apparatus is disclosed that includes a primary memory storing data and a mirrored memory storing mirrored data that includes a copy of the data. The mirrored data may be compressed. A processor may be in communication with both the primary memory and the mirrored memory, and program code may be configured to be executed by the processor to detect a failure condition associated with the data of the primary memory, and in response to the detected failure condition, to access the mirrored data in the mirrored memory.

In another embodiment, a program product includes program code to be executed by a processor in communication with both a primary memory storing data and a mirrored memory storing mirrored data including a copy of the data. The program code may be executed to detect a failure condition associated with the data of the primary memory, and in response to the detected failure condition, to access the mirrored data in the mirrored memory. A computer readable storage medium may bear the program code.

An embodiment may use memory compression techniques with mirrored memory to increase the amount of mirrored and primary memory available in a system. Because data in the primary memory is uncompressed, there may be no memory access latency penalty due to decompression under normal operating conditions. Memory space and capacity made available by the memory compression may be used for additional primary memory. The reduction in additional physical memory may reduce the cost overhead of memory mirroring. The decreased costs may encourage use of memory mirroring in a broad range of computing applications.

Features that characterize embodiments are set forth in the claims annexed hereto and forming a further part hereof. However, for a better understanding of embodiments, and of the advantages and objectives attained through their use, reference should be made to the Drawings and to the accompanying descriptive matter.

V. DETAILED DESCRIPTION

A particular embodiment uses memory compression to lower the size and cost associated with memory mirroring by compressing mirrored memory and not primary memory. The mirrored data may only be accessed when the primary memory fails. For normal operations (e.g., operations having no or an acceptable number of errors), there may be no decompression latency or performance overhead when uncompressed primary data is accessed.

Errors may be detected in the primary memory. In response to the detected failure, a processor may seamlessly transition from executing out of the uncompressed primary memory to the compressed mirrored memory. The processor may continue to operate without crashing when the primary memory fails, though at a degraded level of performance due to the decompression latency overhead. The defective primary memory may be repaired or replaced at a convenient time to return the computer back to full performance.

Switching from the primary memory to the mirrored memory when a failure is detected may be accomplished by hardware memory control logic, a hypervisor, or by an operating system. Virtual addresses may be changed to point from the primary physical address to the physical address in the mirrored memory that contains the copy of data. Memory compression techniques may be used to reduce the primary memory size when memory compression ratios do not allow the full primary memory size to fit into the compressed mirrored size.

In a particular embodiment, switching from primary memory to mirrored memory may be conditional on the type of memory failure and/or the frequency of memory failures. For example, an uncorrectable error may always prompt a switch from primary memory to mirrored memory. In contrast, a single bit correctable error may not automatically cause a switch. However, a high number of single bit errors may prompt a switch from primary to mirrored memory.

Memory space and capacity made available by the memory compression may be used for additional primary memory. The compressed mirrored memory may be configured to be about a quarter or less of the physical size of the primary memory. The reduction in additional physical memory reduces the cost overhead of memory mirroring. The decreased costs may encourage use of memory mirroring in a broad range of computing applications. Memory compression techniques may thus be used with mirrored memory to reduce the cost of mirroring and to increase the amount of mirrored and primary memory available in a system.

Figure 1:
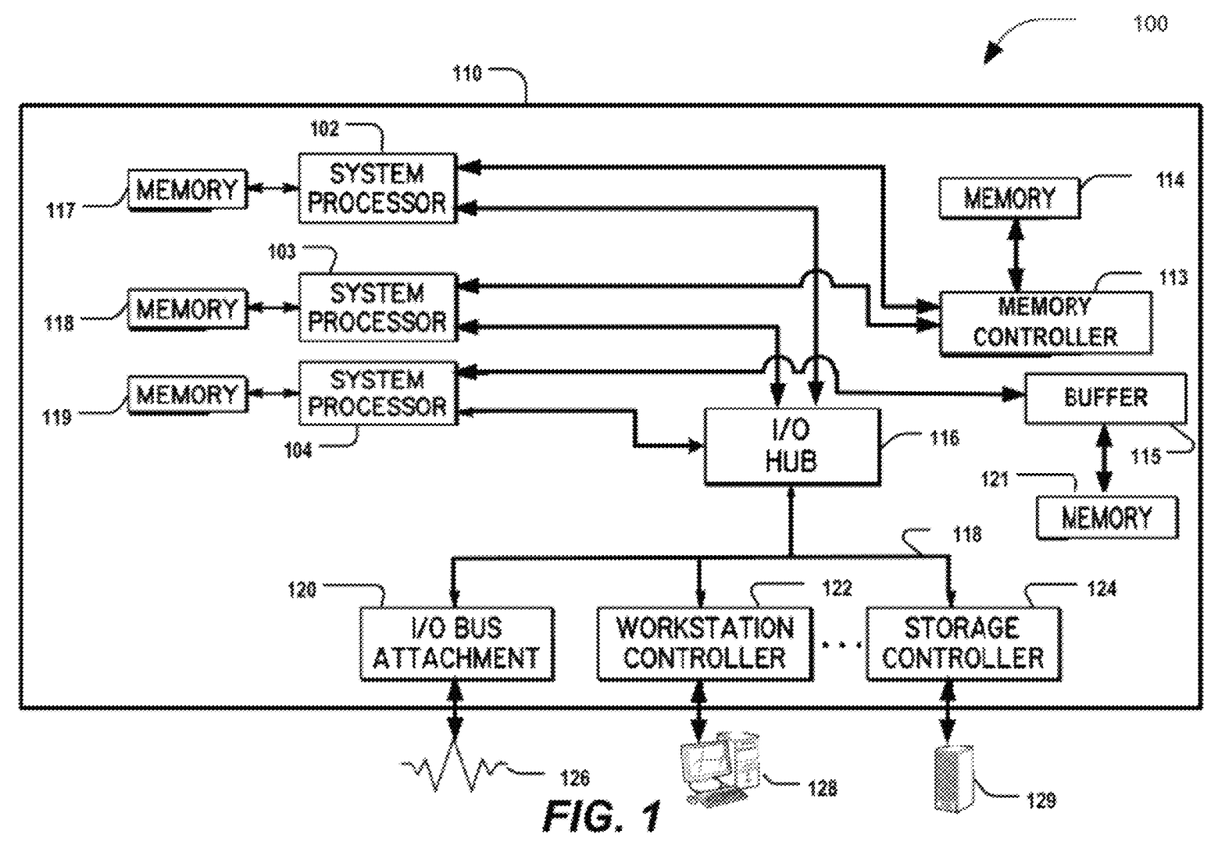
FIG. 1 is a block diagram of an embodiment of a computing system configured to access compressed mirrored data in response to a detected failure in primary memory.

Turning more particularly to the drawings, FIG. 1 illustrates a data processing apparatus 100 configured to execute methods of an embodiment configured to access compressed mirrored data in response to a detected failure in primary memory. The apparatus 100 generically represents, for example, any of a number of multi-user computer systems such as a network server, a midrange computer, and a mainframe computer, among others. However, embodiments may be implemented in another data processing apparatus, e.g., in stand-alone or single-user computer systems such as workstations, desktop computers, portable computers, and the like, or in other computing devices such as embedded controllers. One implementation of the apparatus 100 may be a multi-user computer, such as the Power Systems computer available from International Business Machines Corporation (IBM).

The apparatus 100 generally includes one or more physical processors 102-104 coupled to an input/output (I/O) hub 116. Each processor 102-104 may directly and respectively attach to a memory 117-119, e.g., an array of dual in-line memory modules (DIMMs). The physical processors 102-104 may be multithreaded. Multithreading enables the physical processors 102-104 to concurrently execute different portions of program code. The processors 102, 103 may be in communication with a memory controller 113 that is coupled to an additional memory 114. A buffer 115 and an additional memory 121 may be coupled to the processor 104.

The I/O hub 116 may further couple to a number of types of external I/O devices via a system bus 118 and a plurality of interface devices. Illustrative I/O devices include a bus attachment interface 120, a workstation controller 122, and a storage controller 124. Such I/O devices may respectively provide external access to one or more external networks 126, one or more workstations 128, and/or one or more storage devices, such as a direct access storage device (DASD) 129.

Figure 2:
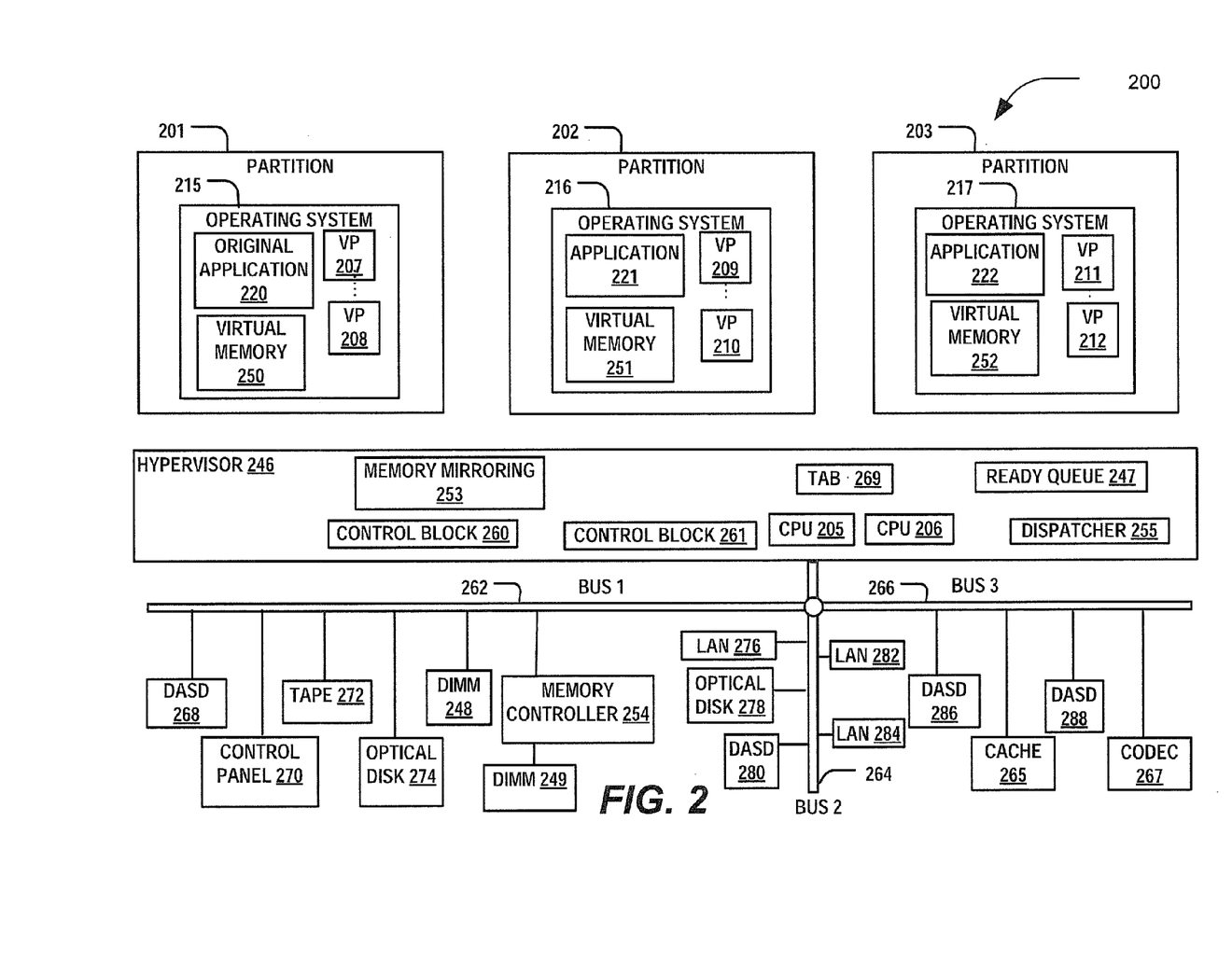
FIG. 2 is a block diagram illustrating in greater detail the primary software components and resources used to implement a logically partitioned environment consistent with the computing system of FIG. 1.

FIG. 2 illustrates in greater detail the primary software components and resources used to implement a logically partitioned environment consistent with the apparatus 100 of FIG. 1. FIG. 2 generally shows a computing architecture characterized as a virtual machine design developed by IBM. The system 200 includes a plurality of partitions 201-203 that share common processing resources among multiple processes. Such an architecture may rely upon a single computing machine having one or more central processing units (CPUs) 205, 206. The CPUs 205, 206 may execute software configured to simulate multiple virtual processors 207-212.

The partitions 201-203 may logically comprise a portion of a system's physical CPUs 205, 206, DASD 268, and other resources, as assigned by an administrator. Each partition 201-203 typically hosts an operating system 215-217 that include the virtual processors 207-212. Each partition 201-203 may operate as if it is a separate computer. As shown in FIG. 2, the production environment comprising each partition 201-203 may also include program code, such as the applications 220-222 shown in FIG. 2.

An underlying program called a hypervisor 246, or partition manager, may assign physical resources to each partition 201-203. In virtualization technology, the hypervisor 246 may manage the operating systems 215-217 (or multiple instances of the same operating system) on a single computer system. The hypervisor 246 may manage the system's processor, memory, and other resources to allocate resources to each operating system 215-217. For instance, the hypervisor 246 may intercept requests for resources from the operating systems 215-217 to globally share and allocate resources. If the partitions 201-203 are sharing processors, the hypervisor 246 may allocate physical processor cycles between the virtual processors 207-212 of the partitions 201-203 sharing one or more of the CPUs 205, 206.

The hypervisor 246 may include a memory mirroring program 253 configured to transition from uncompressed, primary memory, (such as may be stored at DIMM 248) to compressed, mirrored memory (e.g., at DIMM 249). The memory mirroring program 253 may transition CPU accesses to the mirrored memory when a failure is detected in the primary memory. In another embodiment, a memory mirroring program may be included within an operating system.

Each operating system 215-217 may control the primary operations of its respective logical partition 201-203 in the same manner as the operating system of a non-partitioned computer. Each logical partition 201-203 may execute in a separate memory space, represented by virtual memory 250-252. Moreover, each logical partition 201-203 may be statically and/or dynamically allocated a portion of available resources in the system 200. For example, each logical partition 201-203 may share one or more of the CPUs 205, 206, as well as a portion of the available memory space for use in virtual memory 250-52. In this manner, a given CPU 205, 206 may be utilized by more than one of the logical partitions 201-203.

The hypervisor 246 may include a dispatcher 255 that manages the dispatching of virtual processors 207-212 to the CPUs 205, 206 on a dispatch list, or ready queue 247. The ready queue 247 comprises memory that includes a list of the virtual processors 207-212 having work that is waiting to be dispatched on a CPU 205, 206. The hypervisor 246 shown in FIG. 2 also controls the CPUs 205, 206, and may additionally control a memory controller 254 and the DIMMs 248, 249. Processor control blocks 260, 261 of the hypervisor 246 include memory that includes a list of the virtual processors 207-212 waiting for access on the CPUs 205, 206.

Additional resources, e.g., mass storage, backup storage, user input, network connections, and the like, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may be allocated to multiple logical partitions 201-213 at a time. FIG. 2 illustrates, for example, three logical buses 262, 264 and 266, with a plurality of resources on the bus 262, including a direct access storage device (DASD) 268, a control panel 270, a tape drive 272 and an optical disk drive 274, allocated to a partition.

The bus 264 may have resources allocated on a resource-by-resource basis, e.g., with a local area network (LAN) adaptor 276, optical disk drive 278 and a DASD 280 allocated to logical partition 202, and LAN adaptors 282, 284 allocated to logical partition 203. The bus 266 may represent, for example, a bus allocated specifically to the logical partition 203, such that all resources on the bus 266 (e.g., the DASDs 286, 288), are allocated to the same logical partition 203. The hardware shown in FIG. 2 optionally includes one or more caches 265.

Figure 3:
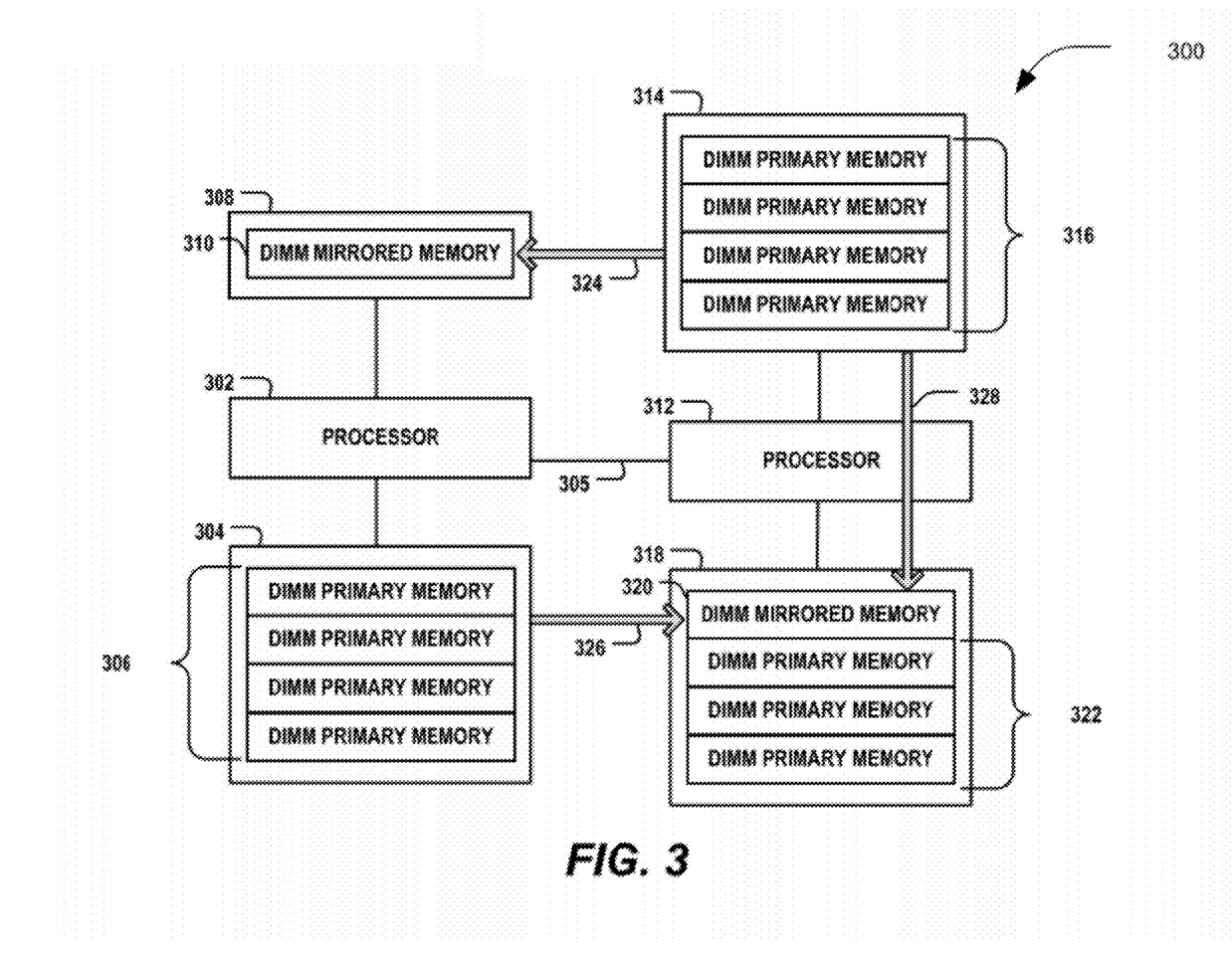
FIG. 3 is a block diagram of an embodiment of a system that includes two processors configured to switch from using directly attached, uncompressed, primary memory to directly attached, compressed, mirrored memory in response to a failure associated with the primary memory.

FIG. 3 shows an embodiment of a system 300 that includes two processors 302, 312 that each has directly attached memory 304, 308, 314, and 318. The system 300 may be configured to switch from using uncompressed, primary memory 306, 316, 322 to using compressed, mirrored memory 310, 320 in response to a failure associated with the primary memory 306, 316, 322. The processors 302, 312 may be similar to the processors 101-103 of FIG. 1 and to the CPUs 205, 206 of FIG. 2. The memory 304, 308, 314, and 318 may be similar to the memory 117-119 of FIG. 1 and to the DIMMs 248, 249 of FIG. 2.

The first processor 302 of FIG. 3 may be coupled to the first memory 304 that includes a first array of DIMM primary memory 306. The first processor 302 may also be coupled to the second memory 308 that includes a first DIMM mirrored memory 310. The second processor 312 may be coupled to the third memory 314 that includes a second array of DIMM primary memory 316. The second processor 312 may also be coupled to the fourth memory 318 that includes an array of DIMM mirrored memory 320 and the third array of DIMM primary memory 322. The fourth memory 318 may be housed on a circuit board. As such, both compressed mirrored data and uncompressed primary data may be housed on a common circuit board. A processor bus 305 may be coupled to both the first processor 302 and the second processor 312.

In the embodiment of FIG. 3, the first DIMM mirrored memory 310 mirrors the second array of DIMM primary memory 316, as indicated by arrow 324. The first DIMM mirrored memory 310 may include compressed data. For example, the first DIMM mirrored memory 310 may include a compressed version of the data in the second array of DIMM primary memory 316. In a particular embodiment, the compression ratio of the compressed data in the first DIMM mirrored memory 310 (e.g., as compared to the uncompressed data in the second array of DIMM primary memory 316) may be about four to one, although other ratios may be used in other embodiments.

The array of DIMM mirrored memory 320 may mirror the first array of DIMM primary memory 306, as indicated by arrow 326. The array of DIMM mirrored memory 320 may include compressed data. For example, the array of DIMM mirrored memory 320 may include a compressed version of the data in the first array of DIMM primary memory 306. The compression ratio of the compressed data in the array of DIMM mirrored memory 320 (e.g., as compared to the uncompressed data in the first array of DIMM primary memory 306) may be about four to one.

The second memory 308 may occupy less space than the third memory 314 by virtue of having the compressed, mirrored data in the first DIMM mirrored memory 310. Alternatively, the space savings attributable to the compressed, mirrored data in the array of DIMM mirrored memory 320 in the fourth memory 318 may provide space for additional primary memory (e.g., the third array of DIMM primary memory 322).

As indicated by arrow 328, the array of DIMM mirrored memory 320 may mirror the second array of DIMM primary memory 316. For example, the second processor 312 may replicate and compress data of the second array of DIMM primary memory 316 for storage in the array of DIMM mirrored memory 320. The second processor 312 may operate out of, or access, the second array of DIMM primary memory 316 during normal (e.g., expected) runtime operations. The detection of an error or other fault condition may cause the second processor 312 to operate out of the array of DIMM mirrored memory 320.

One or more of the first processor 302 and the second processor 312 may include compression logic to compress data when stored in the first DIMM mirrored memory 310 and the array of DIMM mirrored memory 320. When being compressed, data may be encoded (represented as symbols) to take up less space. In a particular embodiment, memory compression may expand memory capacity about four times without increasing actual physical memory. Memory compression may be measured in terms of its associated compression ratio. The compression ratio is the quotient of memory space required by uncompressed data relative to the smaller amount of memory space required by compressed data.

At least one of a hypervisor and an operating system, such as the hypervisor 246 and the operating system 217 of FIG. 2, may be configured to control the transition from accessing the second array of DIMM primary memory 316 to accessing the first DIMM mirrored memory 310. For example, the hypervisor or operating system may change a virtual address of the first DIMM mirrored memory 310 to that of the second array of DIMM primary memory 316. Similarly, one of a hypervisor and an operating system may be configured to control the transition from accessing the first array of DIMM primary memory 306 to accessing the array of DIMM mirrored memory 320. The hypervisor or the operating system may use cycles of the one or more of the first processor 302 and the second processor 312 to execute the transitions to the first DIMM mirrored memory 310 and to the array of DIMM mirrored memory 320.

One or more of the first processor 302 and the second processor 312 may be configured to coordinate memory ballooning processes. For instance the first processor 302 may limit storage space in the first array of DIMM primary memory 306 to reduce the amount of storage used in the array of DIMM mirrored memory 320. Such an action may be initiated in response to a determination that the array of DIMM mirrored memory 320 does not have adequate storage capacity for the data in the first array of DIMM primary memory 306. As such, the storage capacity of the first array of DIMM primary memory 306 may be limited based on the storage capacity of the array of DIMM mirrored memory 320.

FIG. 3 thus shows an embodiment of a system 300 that compresses mirrored data and not primary (non-mirrored) data to maintain performance and save space. Data compression in the mirrored memory 310, 320 may facilitate space savings that may be allocated to additional memory or other resources, such as additional processing components. The uncompressed memory of the first array of DIMM primary memory 306, the second array of DIMM primary memory 316, and the third array of DIMM primary memory 322 may be used during normal operations to facilitate efficient processing. The compressed data of the first DIMM mirrored memory 310 and the array of DIMM mirrored memory 320 may be accessed only when a memory failure is detected.

Figure 4:
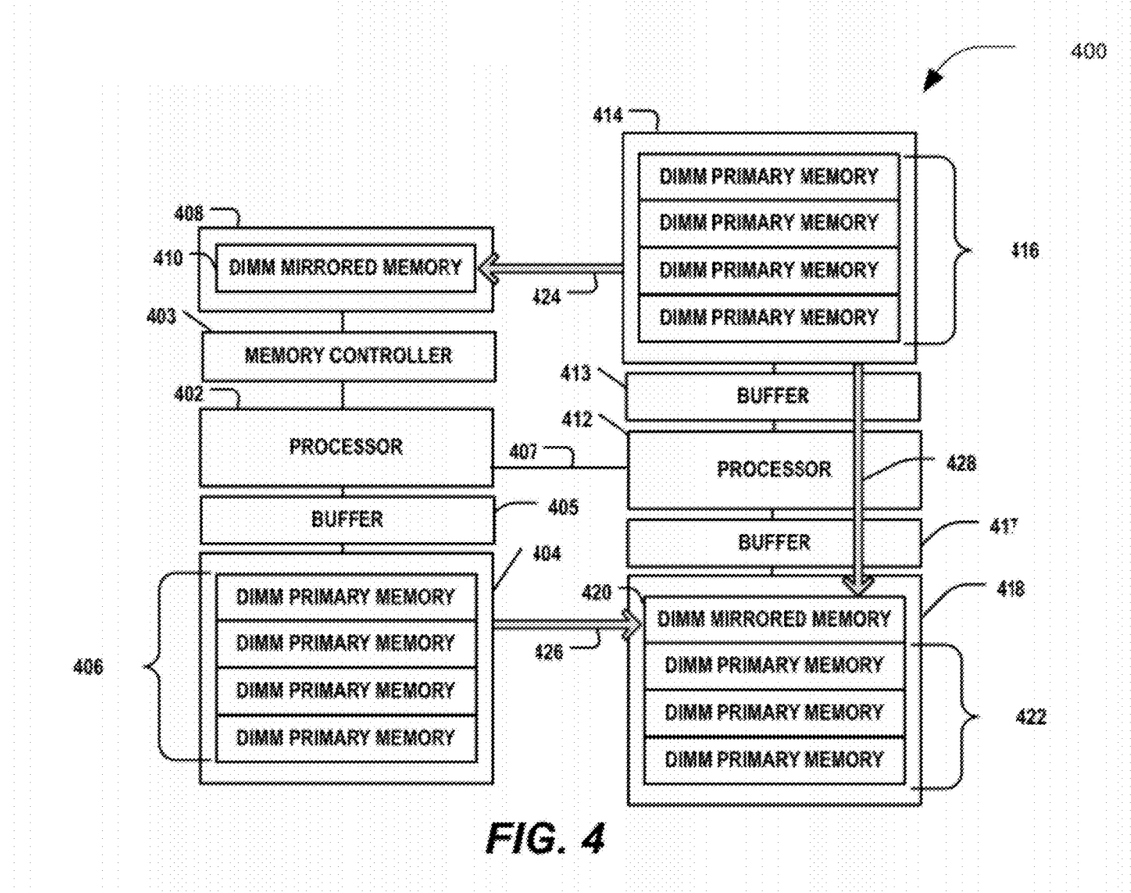
FIG. 4 is a block diagram of a particular embodiment of a system configured to access compressed mirrored data in response to a detected failure in primary memory and to compress and decompress memory using at least one of a memory controller and a buffer.

FIG. 4 shows an embodiment of a memory system 400 that is similar to the system 300 of FIG. 3, but that includes a memory controller 403 and buffers 405, 413, 417. The memory controller 403 may be similar to the memory controller 113 of FIG. 1, and the buffers 405, 413, and 417 may be similar to the buffer 115 of FIG. 1. The memory controller 403 of FIG. 4 may include a digital circuit external to the first processor 402 that is configured to manage a flow of data between at least two of the processors 402, 412, the buffers 405, 413, 417, and the memories 404, 408, 414, 418. The buffers 405, 413, 417 may be configured to work in conjunction with one or more of the processors 402, 412 to temporarily hold data while it is being moved between at least two of the processors 402, 412, the buffers 405, 413, 417, and the memories 404, 408, 414, 418. The buffer 405 may be coupled in between a first processor 402 and a first memory 404 that includes a first array of DIMM primary memory 406. The memory controller 403 may be coupled in between the first processor 402 and the second memory 408 that includes a first DIMM mirrored memory 410.

The buffer 413 may be coupled in between the second processor 412 and the third memory 414 that includes a second array of DIMM primary memory 416. The third buffer 417 may be coupled in between the second processor 412 and the fourth memory 418 that includes the array of DIMM mirrored memory 420 and the third array of DIMM primary memory 422. A processor bus 407 may be coupled to both the first processor 402 and the second processor 412.

In the embodiment of FIG. 4, the first DIMM mirrored memory 410 may mirror the second array of DIMM primary memory 416, as indicated by arrow 424. The first DIMM mirrored memory 410 may include compressed data. For example, the first DIMM mirrored memory 410 may include a compressed version of the data in the second array of DIMM primary memory 416. In a particular embodiment, the compression ratio of the compressed data in the first DIMM mirrored memory 410 (e.g., as compared to the uncompressed data in the second array of DIMM primary memory 416) may be about four to one, although other ratios may be used in other embodiments.

The array of DIMM mirrored memory 420 may mirror the first array of DIMM primary memory 406, as indicated by arrow 426. The array of DIMM mirrored memory 420 may include compressed data. For example, the array of DIMM mirrored memory 420 may include a compressed version of the data in the first array of DIMM primary memory 406. The compression ratio of the compressed data in the array of DIMM mirrored memory 420 as compared to the uncompressed data in the first array of DIMM primary memory 406 may be about four to one, as with the first DIMM mirrored memory 410.

The second memory 408 may occupy less space by virtue of the compressed, mirrored data in the first DIMM mirrored memory 410. Alternatively, the space savings attributable to the compressed, mirrored data in the array of DIMM mirrored memory 420 in the fourth memory 418 may provide space for additional primary memory, such as the third array of DIMM primary memory 422.

As indicated by arrow 428, the array of DIMM mirrored memory 420 may mirror the second array of DIMM primary memory 416. For example, one or more of the processors 402, 412 the memory controller 403, and the buffers 405, 413, 417 may replicate and compress data of the second array of DIMM primary memory 416 to be stored in the array of DIMM mirrored memory 420. The second processor 412 may operate out of, or access, the second array of DIMM primary memory 416 during normal runtime operations. The detection of an error or other fault condition may cause the second processor 412 to operate out of the array of DIMM mirrored memory 420.

One or more of the first processor 402, the second processor 412, the memory controller 403, the buffer 405, the buffer 413, and the buffer 417 may include compression logic to compress data when stored in the first DIMM mirrored memory 410 and the array of DIMM mirrored memory 420. At least one of a hypervisor and an operating system, such as the hypervisor 246 and the operating system 215 of FIG. 2, may be configured to control the transition from accessing the second array of DIMM primary memory 416 to accessing the first DIMM mirrored memory 410. For example, the hypervisor or operating system may change a virtual address of the first DIMM mirrored memory 410 to be the same as that of the second array of DIMM primary memory 416. Similarly, one of the hypervisor and the operating system may be configured to control the transition from accessing the first array of DIMM primary memory 406 to accessing the array of DIMM mirrored memory 420. The hypervisor or the operating system may use cycles of the first processor 402 and the second processor 412, or may use the memory controller 403, the buffer 405, the buffer 413, and the buffer 417 to execute the transitions to the first DIMM mirrored memory 410 and to the array of DIMM mirrored memory 420.

One or more of the first processor 402, the second processor 412, the memory controller 403, the buffer 405, the buffer 413, and the buffer 417 may further be configured to coordinate memory ballooning processes. For instance, storage space in the first array of DIMM primary memory 406 may be limited in order to reduce the amount of storage used in the array of DIMM mirrored memory 420. Such an action may be initiated in response to a determination that the array of DIMM mirrored memory 420 does not have adequate storage capacity for the data in the first array of DIMM primary memory 406. As such, the storage capacity of the first array of DIMM primary memory 406 may be limited based on the storage capacity of the array of DIMM mirrored memory 420.

FIG. 4 thus shows how data compression may be used in a memory mirroring environment that includes either of a memory controller 403 or a buffer 405, 413, and 417 coupled in between a processor 402, 412 and mirrored memory 410, 420. Data compression and decompression may occur in the memory controller 403 or the buffers 405, 413, and 417. Data compression in the mirrored memory 410, 420 may facilitate space savings that may be allocated to additional memory or other resources.

Figure 5:
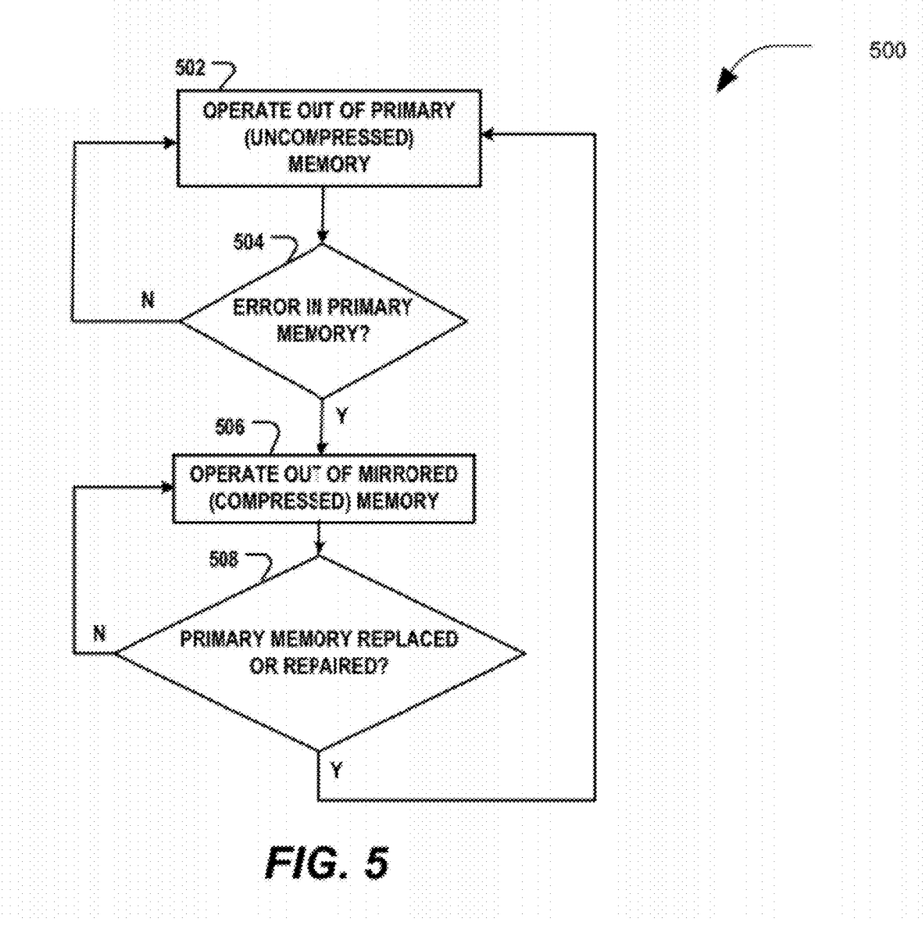
FIG. 5 is a flowchart of an embodiment of a method of managing memory that includes using uncompressed data in primary memory during normal operation and using compressed data in mirrored memory when errors are detected in the primary memory.

FIG. 5 shows an embodiment of a method 500 of managing memory by compressing mirrored data. The method 500 may be executed by one of the systems 100, 200, 300, 400 of FIGS. 1-4. At 502, a processor may operate out of primary memory. The primary memory may be uncompressed. For example, the first processor 302 of FIG. 3 may access the uncompressed data of the first array of DIMM primary memory 306 during normal operation. Because the data in the first array of DIMM primary memory 306 is uncompressed, no performance penalty may be incurred during normal operation.

An error in the primary memory may be detected, at 504. For instance, error correction codes may be evaluated to determine if the data read from the primary memory includes uncorrectable errors or a high number of correctable errors. In FIG. 3, an error or another memory failure may be detected in the first array of DIMM primary memory 306.

At 506, the processor may operate out of mirrored compressed memory. In response to a detected failure in the primary memory, the processor may access the mirrored compressed memory. For example, the first processor 302 of FIG. 3 may access the array of DIMM mirrored memory 320 when an error is detected in the first array of DIMM primary memory 306. Because the data of the array of DIMM mirrored memory 320 is compressed, a performance penalty may be incurred while the array of DIMM mirrored memory 320 is accessed.

At 508, the method 500 may include determining if the primary memory has been repaired or replaced. The processor may access the mirrored memory until the primary memory can be repaired or replaced. For instance, the first processor 302 of FIG. 3 may continue to access the array of DIMM mirrored memory 320 until the first array of DIMM primary memory 306 is replaced or repaired.

FIG. 5 thus shows a flowchart of an embodiment of a method 500 of managing memory that includes using uncompressed data in primary memory during normal operation and using compressed data in mirrored memory when errors are detected in the primary memory. While a performance penalty may be accrued when accessing the compressed data of the mirrored memory, such a performance penalty may be avoided during normal operations. The reduced size demands of the compressed mirrored data may allow for additional circuit space, such as may be used for additional primary memory.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc. For example, switching between primary memory and mirrored memory may be implemented using hardware logic on memory interface silicon in a manner that is transparent to both the hypervisor and operating system software. Embodiments may include features where hardware controls the switch between the physical memory it is operating out of (e.g., either primary or mirrored memory).

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. For example, an embodiment may include multiple processors connected to a single memory controller, either using separate processor busses from each processor to the memory controller, or using a single shared system bus that is connected to all processors and the memory controller. In another example, embodiments may facilitate partial mirroring applications, where only a portion of the memory is stored in a specified memory address range that is to be mirrored. Thus, the present disclosure is not intended to be limited to the embodiments shown herein but is to be accorded the widest scope possible consistent with the principles and features as defined by the following claims.

The invention claimed is:

1. A method of managing memory, the method comprising:
storing data in a primary memory in communication with a processor;
storing in a mirrored memory mirrored data that mirrors the data stored in the primary memory, wherein the mirrored data is compressed and wherein the mirrored memory is in communication with the processor;
detecting a failure condition associated with the primary memory;
in response to the detected failure condition, enabling the processor to access the mirrored data in the mirrored memory and disabling the processor from accessing the data in the primary memory, wherein enabling the processor to access the mirrored data in the mirrored memory and disabling the processor from accessing the data in the primary memory further comprises changing a virtual address associated with a physical address of the primary memory to a virtual address associated with a physical address of the mirrored memory; and
in response to a corrective action configured to resolve the failure condition, enabling the processor to access the data in the primary memory and disabling the processor from accessing the mirrored data in the mirror memory.

2. The method of claim 1, further comprising determining whether to access the mirrored memory based on a type of the failure condition, a frequency of the failure condition, or both.

3. The method of claim 1, further comprising using at least one of the processor, a hypervisor, or an operating system to switch from enabling the processor to access the data in the primary memory to enabling the processor to access the mirrored data in the mirrored memory.

4. The method of claim 1, further comprising compressing the mirrored data using a compression ratio of about four to one.

5. The method of claim 1, further comprising using at least one of the processor, a hypervisor, or an operating system to detect the failure condition.

6. The method of claim 1, further comprising housing the mirrored memory and the primary memory on a common circuit board.

7. The method of claim 1, further comprising limiting a data capacity of the primary memory based on a capacity of the mirrored memory.

8. The method of claim 1, wherein the mirrored memory further stores second mirrored data that mirrors second data stored in a second primary memory.

9. The method of claim 1, further comprising storing in a second mirrored memory second mirrored data that mirrors the data stored in the primary memory.

10. An apparatus, comprising:
- a primary memory configured to store data, wherein the data is uncompressed;
- a mirrored memory configured to store mirrored data including a copy of the data, wherein the mirrored data is compressed; and
- a processor in communication with the primary memory and the mirrored memory, wherein the processor is configured to:
  - detect a failure condition associated with the primary memory; and
  - in response to the detected failure condition, access the mirrored data in the mirrored memory, wherein accessing the mirrored data in the mirrored memory includes disabling the processor from accessing the data in the primary memory by changing a virtual address associated with a physical address of the primary memory to a virtual address associated with a physical address of the mirrored memory.

11. The apparatus of claim 10, wherein the failure condition includes a detected error.

12. The apparatus of claim 10, wherein the processor is directly coupled to the primary memory.

13. The apparatus of claim 10, further comprising a buffer coupled in between the processor and the primary memory, the mirrored memory, or both.

14. The apparatus of claim 10, further comprising a memory controller coupled in between the processor and the primary memory, the mirrored memory, or both.

15. The apparatus of claim 10, wherein the mirrored memory and the primary memory are housed on a common circuit board.

16. The apparatus of claim 10, wherein the processor is configured to limit a data capacity of the primary memory based on a capacity of the mirrored memory.

17. The apparatus of claim 10, wherein the mirrored memory occupies a smaller space than the primary memory on a circuit board.

18. A computer-readable storage device storing instructions that, when executed by a computer, cause the computer to perform operations comprising:
- detecting a failure condition associated with a primary memory;
- in response to the detected failure condition, enabling a processor to access mirrored data in a mirrored memory and disabling the processor from accessing the data in the primary memory, the mirrored data including a copy of the data, wherein enabling the processor to access the mirrored data in the mirrored memory and disabling the processor from accessing the data in the primary memory includes changing a virtual address associated with a physical address of the primary memory to a virtual address associated with a physical address of the mirrored memory; and
- in response to a corrective action configured to resolve the failure condition, enabling the processor to access the data in the primary memory and disabling the processor from accessing the mirrored data in the mirrored memory.

* * * * *